United States Patent
Knauseder

(10) Patent No.: US 6,942,418 B2
(45) Date of Patent: Sep. 13, 2005

(54) DEVICE FOR CONNECTING TWO SHEETS, IN PARTICULAR WORK SHEETS

(75) Inventor: Franz Knauseder, Salzburg (AT)

(73) Assignee: Kaindl, M, Wals (AT)

( * ) Notice: Subject to any disclaimer, the term of this patent is extended or adjusted under 35 U.S.C. 154(b) by 38 days.

(21) Appl. No.: 10/311,901

(22) PCT Filed: Jun. 25, 2001

(86) PCT No.: PCT/AT01/00202

§ 371 (c)(1),
(2), (4) Date: May 30, 2003

(87) PCT Pub. No.: WO02/01084

PCT Pub. Date: Jan. 3, 2002

(65) Prior Publication Data

US 2004/0009036 A1 Jan. 15, 2004

(30) Foreign Application Priority Data

Jun. 27, 2000 (AT) .......................................... 1099/2000

(51) Int. Cl.[7] ................................................ F16D 1/00
(52) U.S. Cl. ..................... 403/231; 403/321; 403/408.1
(58) Field of Search ......................... 403/DIG. 12, 231, 403/245, 321, 408.1

(56) References Cited

U.S. PATENT DOCUMENTS 5,667,327 A * 9/1997 Salice ................. 403/DIG. 12
5,810,505 A * 9/1998 Henriott et al. ...... 403/DIG. 12
5,934,819 A    8/1999 Mangold
6,142,700 A * 11/2000 Grieser et al. ....... 403/DIG. 12

FOREIGN PATENT DOCUMENTS

| DE | 20 23 016 A1 | 11/1971 |
| DE | 41 33 520 A1 | 4/1993 |
| DE | 295 04 622 U1 | 5/1995 |
| FR | 2 180 139 A5 | 11/1973 |
| GB | 152 834 A1 | 10/1920 |

* cited by examiner

Primary Examiner—John R. Cottingham
(74) Attorney, Agent, or Firm—Millen, White, Zelano & Branigan, P.C.

(57) ABSTRACT

To connect the mutually contacting faces of two sheets, in particular counter tops, in a simple manner such that the top surfaces lie in a common plane, the invention provides an arrangement which consists of two fitting parts (7, 12) each connected to one sheet (1, 2). The first fitting part (7) is provided with a recess (9) open to the bottom whose limiting wall (10) facing the other sheet (2) has a slot open toward the bottom. The fitting part (12) fastened to the other sheet (2) is provided with a threaded hole into which a screw (17) is inserted. The screw (17) is inserted into the slot such that the head is accommodated by the recess (9) and is supported by the limiting wall (10) accommodating the slot (11). To adjust the height, adjustment screws (12) are provided in flanges (15) of fitting part (12) which interact with the base plate of fitting part (7).

8 Claims, 2 Drawing Sheets

DEVICE FOR CONNECTING TWO SHEETS, IN PARTICULAR WORK SHEETS

BACKGROUND OF THE INVENTION

The invention relates to an arrangement for connecting two sheets whose top surfaces lie in a common plane and whose faces contact each other, in particular counter tops, whereby a first fitting is fastened to the first sheet with a recess open toward the underside of the sheet, while a second fitting is fastened to the other sheet with a threaded hole into which a screw can be turned whose head is supported by a wall of the first fitting.

In particular in the case of kitchen counter tops, mainly in places where these sheets run perpendicularly to each other in a corner of the room, or where they abut against each other at an angle, such as 45 degrees, but also in other places where two sheets adjoin each other, it is necessary that the top surfaces of such sheets lie in a common plane, such that no interfering ledge is formed, since in such cases, even differences of only a few tenths of a millimetre already become quite noticeable. Until now, sheets were glued to each other at their contact faces, and in addition they had to be held in their proper position by means of individually provided auxiliary constructions fastened to the underside of the sheet. This complicates the installation and requires skilled workers, practically eliminating do-it-yourself applications.

In AT 392 333 B, an arrangement is describes for connecting two sheets with fittings fastened in a recess on the underside of the sheet. In that arrangement, a tightening screw is provided in a threaded hole of a movable slide of one half of the fitting which is supported by a conical tip on a slanted surface of the other half of the fitting. By turning the tightening screw, the conical tip slides along the slanted surface, thus causing the mutually contacting faces of the sheets to be pressed together. For adjusting the height of the sheets in relation to each other, an adjusting screw is provided whose head is supported by a wall of the other half of the fitting. Such an arrangement is very complicated in its design and definitely requires an additional arrangement for adjusting the sheets perpendicular to the plane of the sheet, since the conical tip of the tightening screw slides along a slanted edge, which means that the tightening screw alone cannot ensure a definite position of the two sheets perpendicular to the plane of the sheets.

It is the object of the present invention to create an arrangement of the type described above, which is of extremely simple design and can therefore be manufactured cost-effectively, thus also enabling unskilled persons to establish a connection of two sheets whose faces contact each other, such that the top surfaces of the sheets lie in a common plane. To achieve this objective, the invention suggests that the wall is formed by a limiting wall of the recess which is provided with a slot open toward the underside of the sheet for accommodating the screw, whose rotational axis runs approximately parallel to the plane of the sheet, whereby the outside diameter of the screw is smaller than the width of the slot, and whereby the head accommodated by the recess and supported by the limiting wall is larger than the width of the slot.

SUMMARY OF THE INVENTION

In applying the arrangement according to the invention, it is only necessary to fasten the two fitting parts to the underside of the two sheets, preferably in a recess, to position the sheet with the fitting that contains the screw, and then to lower the other sheet such that the screw shaft enters the slot that is open toward the underside of the sheet, and the screws head is in the recess. In the simplest case, another person can align the two sheets such that the top surfaces of the sheets lie in a common plane, after which the screw is turned to press the two mutually contacting faces of the sheets together and thus to fix the sheets in their position.

According to the invention, to ensure the mutual position of the two fitting parts, the second fitting part, with the first fitting part at its side walls which extend across the limiting wall that accommodates the slot, can be provided with surrounding flanges which have clearance, such that the clearance still allows a certain lateral displacement.

To establish a very exact alignment of the two sheets, such that the top surfaces of the sheets lie in a common plane, a preferred embodiment of the invention provides adjustment screws or such in the flanges which are supported by a base plate of the first fitting part which extends parallel to the top surface of the sheets. When these adjustment screws are turned, it becomes possible to align the top surfaces of the sheets to an accuracy of only a few tenths of a millimetre, which means that these top surfaces come to lie exactly in a common plane.

Preferably, the head of the screw to be turned into the threaded hole of the second fitting part is polygonal in shape, and the length of the limiting recess wall with the slot is larger than the width of the screw head, such that a wrench required for turning this screw or screw head can be inserted into this recess.

BRIEF DESCRIPTION OF THE DRAWINGS

In the drawings, the invention is described schematically, using an embodiment as an example.

DETAILED DESCRIPTION OF A PREFERRED EMBODIMENT

Figure 1:
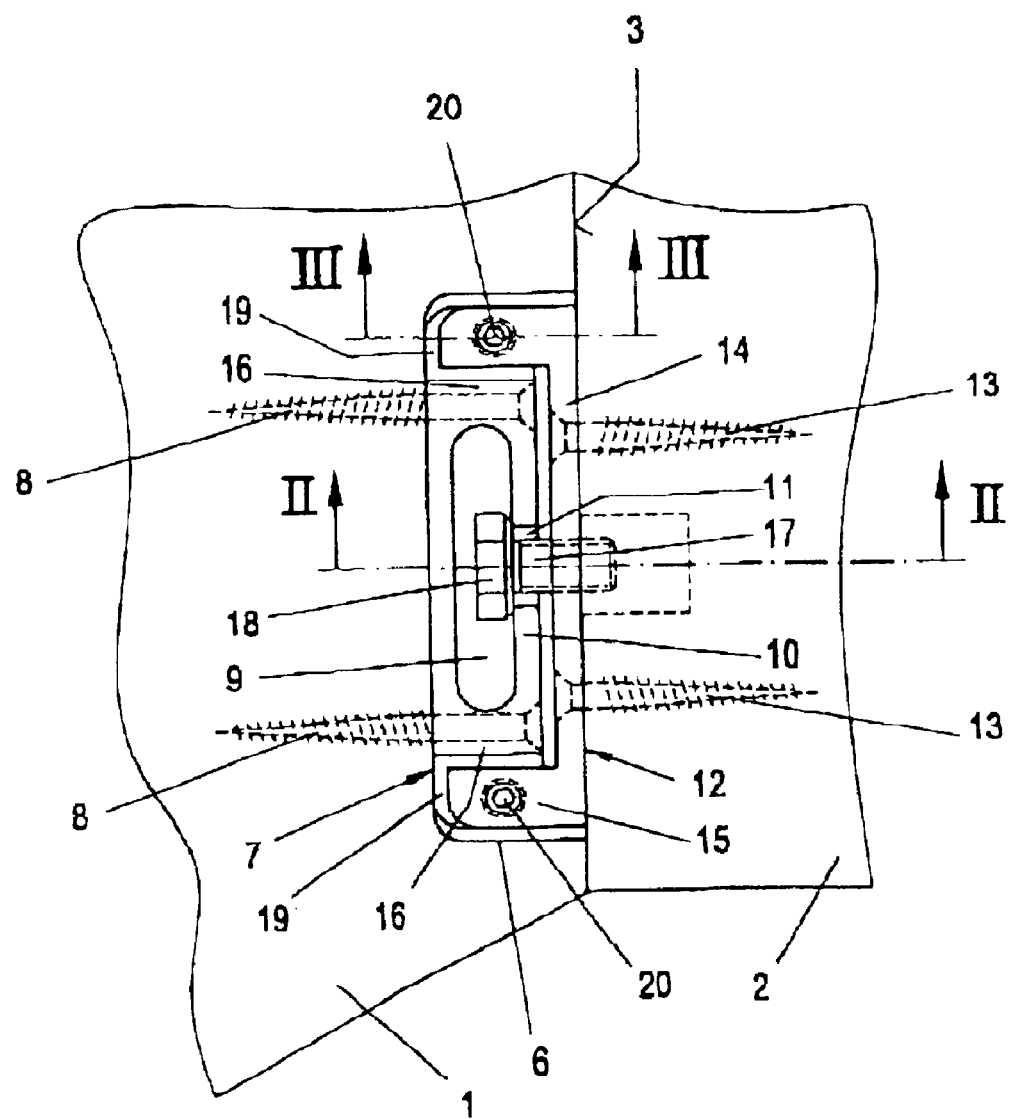
FIG. 1 shows a bottom view of an arrangement according to the invention, set into the recess on the underside of a sheet.
Figure 2:
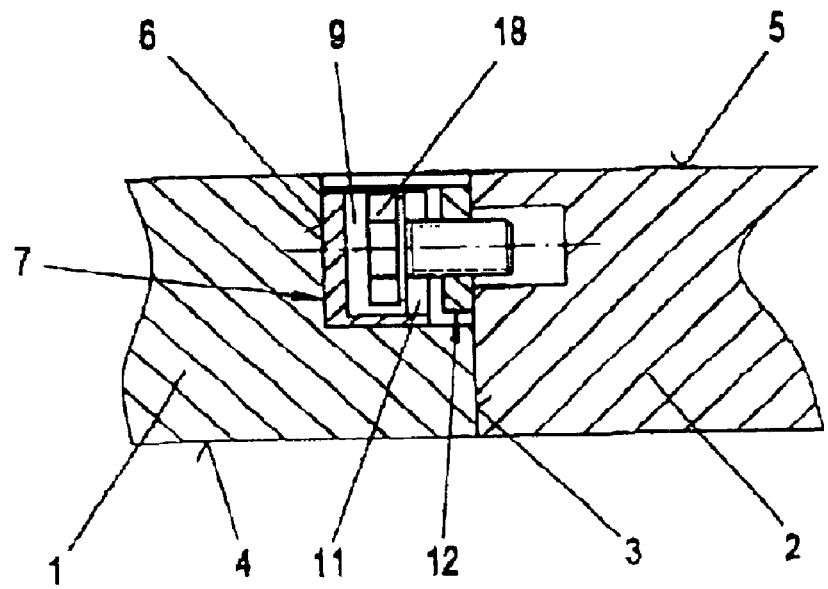
FIG. 2 shows a cross section according to line II—II and FIG. 3 shows a cross section according to the line III—III in FIG. 1. Note that FIGS. 2 and 3 are upside down if the sheets are defining panels for counter tops, rather than sheets in general.
Figure 3:
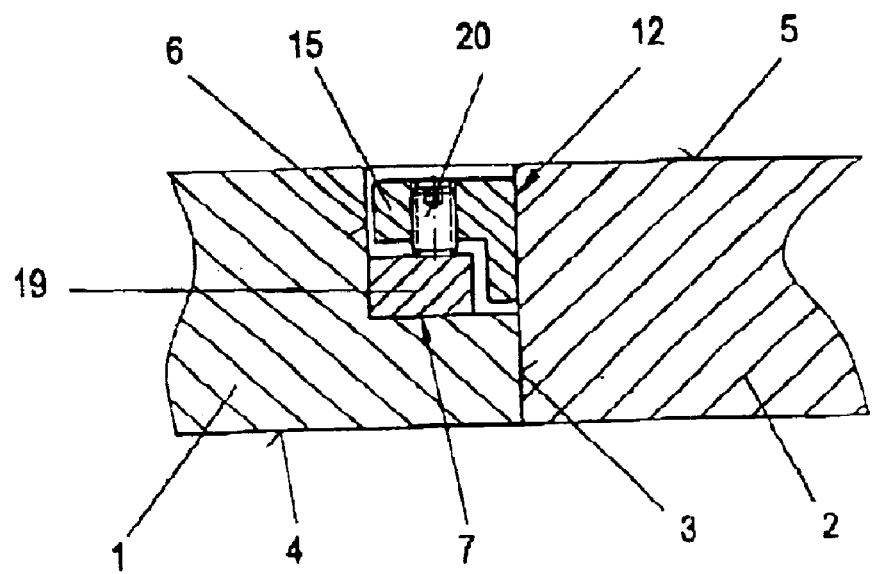

The arrangement according to the invention refers to the connection of two sheets 1, 2 whose faces 3 contact 35 each other and whose top surfaces 4 lie in one plane to form panels, such as panels for counter tops.

The underside 5 of sheet 1 in the area of face 3 is provided with a recess 6 which accommodates a first fitting part 7 that is fastened to sheet one with screws 8. This first fitting part 7 is provided with a recess 9 (open toward the bottom), whose limiting wall 10 faces sheet 2 and accommodates a slot 11 open toward the bottom.

The second fitting part 12 connected to sheet 2 consists of a plate 14 fastened to face 3 of plate 2 with screws 13; said plate 14 is provided with flanges 15 which surround the side walls 16 (which extend across limit wall 10 of the first fitting part 7) with clearance. Screwed into a threaded section of plate 14 is a locking screw which can be inserted into slot 11, which is open toward the bottom, and whose head is designed as a hexagonal head 18 that is supported by the limiting wall 10 when screw 17 is tightened. The length of the limiting wall 10 with slot 11 is such that the wrench required for turning screw 17 can be inserted into recess 9.

The first fitting part is provided with a base plate 19 which extends laterally beyond side walls 16 and which supports the flanges 15. This support is provided via adjustments screws 20 which can be screwed into threaded holes in flanges 15. By turning these adjustment screws, the mutual position of top surface 4 of the two sheets 1, 2 can be set exactly.

The faces to be connected to each other can also include the front nosing of kitchen counter tops joined at any angle, such as 45 degrees or 90 degrees.

What is claimed is:

1. A device for connecting two adjoining sheets (1, 2), comprising two work sheets (1, 2) having top surfaces (4) which lie in a common plane and having edge faces which contact each other, one of the sheets (1) being provided with a first fitting part (7) having a recess (9) that is disposed adjacent to a lateral slot (11) for accommodating a screw (17) extending from the other sheet (2), the outer diameter of the screw (17) being smaller than the width of the slot (11), and the screw (17) having a head (18) that is arranged in the recess (9) and supported by a limiting wall (10) of the recess (9) that is larger than the width of the slot (11), the recess (9) being provided in the first fitting part (7) and being stationary in relation to the one sheet (1) and open toward one side of the one sheet (1), and in that a second fitting part (12), provided with a threaded hole into which the screw (17) is inserted, is fastened in the other sheet (2).

2. The device according to claim 1, wherein the second fitting part (12) has flanges (15) that extend past the limiting wall (10) having the slot (11) therein, and extend with clearance along side walls (16) of the first fitting part (7).

3. The device according to claim 2, wherein in the flanges (15) adjustment screws (20) are provided, the adjustment screws engaging a base plate (19) of the first fitting part (7), which engaging plate (19) extends parallel to the top surface (4) of the sheets (1, 2).

4. The device according to claim 3, wherein the screw head (18) of the screw (17) that is inserted into the threaded hole of the second fitting part (12) is of polygonal design, and wherein the dimension of the limiting wall (10) of the recess (9) that accommodates the slot (11) across the screw axis is larger than the width of the screw head (18).

5. The device of claim 3 wherein the lateral slot (11) opens with respect to one side of the first sheet (1).

6. The device according to claim 5, wherein the screw head (18) of the screw (17) that is inserted into the threaded hole of the second fitting part (12) is of polygonal design, and wherein the dimension of the limiting wall (10) of the recess (9) that accommodates the slot (11) across the screw axis is larger than the width of the screw head (18).

7. The device according to claim 1, wherein the screw head (18) of the screw (17) that is inserted into the threaded hole of the second fitting part (12) is of polygonal design, and wherein the dimension of the limiting wall (10) of the recess (9) that accommodates the slot (11) across the screw axis is larger than the width of the screw head (18).

8. The device of claim 1 wherein the two joining sheets (1, 2) are panels which form counter tops and wherein the recess (9) and lateral slot (11) open through a bottom surface (5) of the panel defined by sheet (1).

\* \* \* \* \*